Patented Jan. 20, 1953

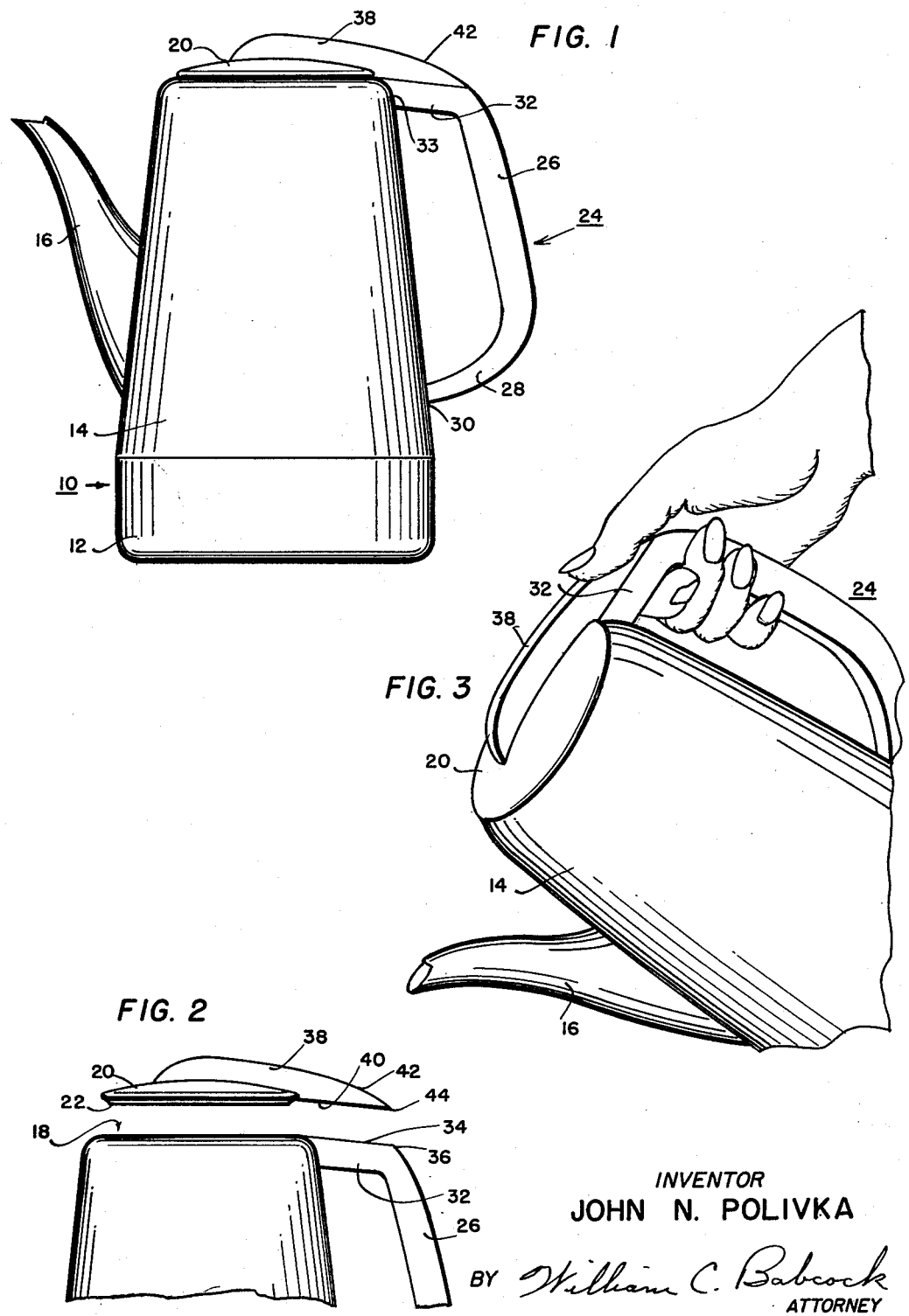
Jan. 20, 1953     J. N. POLIVKA     2,626,088
BEVERAGE POT WITH INSULATED COVER HANDLE
Filed Aug. 7, 1950
INVENTOR
JOHN N. POLIVKA
BY William C. Babcock
ATTORNEY

2,626,088

UNITED STATES PATENT OFFICE 2,626,088

BEVERAGE POT WITH INSULATED COVER HANDLE

John N. Polivka, Minneapolis, Minn., assignor to General Mills, Inc., a corporation of Delaware Application August 7, 1950, Serial No. 178,123

3 Claims. (Cl. 222—465)

1

The present invention relates to beverage pots or containers and more particularly to an improved handle construction for such a device.

Most beverage containers such as coffeepots and teapots are provided with top openings and removable covers through which the necessary ingredients may be inserted into the container. These devices are also provided with a pouring spout and with a carrying handle which can be grasped by the user to tilt the container and pour the beverage from the spout. In such a device, it is necessary to provide some means for retention of the cover on the pot when the latter is tilted to pouring position.

It is one object of the present invention to provide an improved cover retaining means for a beverage dispensing container.

A further object is the provision of a beverage pot in which the body and cover are provided with cooperating handle portions which may be readily grasped by the user to hold the cover on the pot when the latter is tilted.

An additional object is the provision of a beverage pot with a handle of heat insulating material located adjacent the top opening of the pot, and with a projection of heat insulating material mounted on the cover of the pot and extending adjacent the upper portion of the handle at a point normally engaged by the thumb of a person grasping the carrying handle.

Other objects and advantages will be apparent from the following specification in which a preferred embodiment of the invention is described with particular reference to the accompanying drawings. In the drawings, in which like reference characters indicate like parts, Figure 1 is a side view of a beverage container embodying the features of the present invention.

Fig. 2 is a partial side view similar to Fig. 1, but with the cover removed from the pot, and Fig. 3 is a partial perspective view showing the pot after it has been grasped and tilted to pouring position by the user.

As shown in Fig. 1 the beverage container or pot 10 includes a base portion 12 and a main body portion 14. The latter portion is substantially cylindrical but in this particular instance is tapered slightly toward the top. At one side of the main body portion 14 is a pouring spout 16 of standard construction. At the top of the body portion 14 is a top opening 18 (Fig. 2) which is provided with a removable cover 20. Cover 20 includes a depending internal flange 22 designed to fit within the edges of the top opening 18 and prevent lateral movement of the cover when the latter is in closed position.

2

At another side of the pot, in this case the opposite side, a carrying or pouring handle 24 is provided. This handle 24 includes a main hand grip portion 26 which extends substantially vertically or in an upright direction parallel to and spaced from the upright main body portion 14 of the pot itself. At the lower end of this upright hand grip portion 26 there is a lower handle section 28 which extends inwardly to the body of the pot and is secured thereto in suitable manner at 30.

At the upper end of the hand grip portion 26 there is an upper inwardly or transversely extending handle portion 32 which connects the upper end of the main hand grip portion 26 to the body of the pot at a point 33 immediately adjacent the edge of top opening 18. In fact, the upper surface 34 of this upper handle portion 32 lies substantially in the plane of the opening 18 and in this case is inclined just slightly downwardly and outwardly therefrom. The upper surface 34 of the upper handle portion 32 intersects the top of the main hand grip portion 26 at a point 36.

The removable cover 20 is provided with a handle or projection 38 also made of heat insulating material which is secured to its upper surface in suitable fashion. One end of this handle or projection 38 extends radially outwardly beyond the cover and is provided with a lower surface 40 which is complementary to and designed to fit closely against the upper surface 34 of the upper handle portion 32 when the cover 20 is in closed position. The upper surface 42 of this cover projection 38 tapers downwardly and outwardly toward the lower surface 40 and meets the lower surface at a point 44 corresponding to the point of intersection 36 between the upper pouring handle portion 32 and the main hand grip portion 26 of the body handle. Thus the cover handle 38 and the upper handle portion 32 cooperate with each other and fit closely against each other to form in effect a single handle which may be readily grasped between the thumb and forefinger of the user when the pot is lifted for pouring as shown in Fig. 3.

Thus, the handle projection 38 extends above the main pouring handle at a point located beneath the thumb of a person normally grasping the main handle portion 26. By reason of this construction it is possible for the user to grasp simultaneously the main handle portion 26 and the cover projection 38 and upper handle portion 32 during the normal tilting or pouring motion of the container. As long as the cover projection or handle 38 is grasped in this manner it will be apparent that inadvertent removal of the cover 20 as a result of tilting of the pot 14 is prevented.

A construction has accordingly been provided which accomplishes the objects set forth at the beginning of this application and which can be readily and economically adapted for use in standard forms of beverage containers.

Since minor variations and changes in the exact details of construction will be apparent to persons skilled in this field, it is intended that this invention shall cover all such changes and modifications as fall within the spirit and scope of the attached claims.

Now, therefore, I claim:

1. A beverage pot comprising an upright body having a top opening, a removable cover for the opening, a carrying handle of heat insulating material mounted on the body with a main hand-grip portion spaced from the body and extending vertically thereon and terminating near the opening, and a handle member of heat insulating material secured to the cover and having a radial extension overlying and engaging the upper end of the carrying handle when the cover is closed, said extension having a substantially horizontal lower surface projecting to the top of the carrying handle and having a downwardly and outwardly inclined upper surface merging smoothly with the carrying handle for direct engagement beneath the thumb of a hand normally grasping the carrying handle.

2. A beverage pot comprising a body portion having upright sides and a top opening, a spout on one side of the body, a carrying handle on another side of the body, said handle having a main hand grip portion spaced from the side and extending vertically thereof and an upper transverse portion connecting the handgrip portion to the body adjacent the opening and having its upper surface inclined slightly downwardly and outwardly from the plane of the opening and intersecting the top of the handgrip portion at a substantial angle, a removable cover for the opening, and a handle of heat insulating material secured to the cover and having an extension with a lower surface overlapping and engaging the upper transverse carrying handle portion at an area located beneath the thumb of a person normally grasping said main handgrip portion to tilt the pot and spout to pouring position, said extension having an upper surface inclined downwardly and outwardly and intersecting the lower surface of the extension at a point substantially coinciding with the intersection of the upper surface of said transverse portion and the top of said main handgrip portion.

3. A beverage pot having an upright substantially cylindrical body portion with an opening at its upper end, a removable cover for the opening, a spout at one side of the body portion, a pouring handle of heat insulating material mounted on the opposite side of the body and having a main handgrip portion spaced from the pot and extending vertically thereof substantially to the top of the body, the main handgrip portion having an outer surface, an upper transverse portion extending from the top of the handgrip portion to the body adjacent the opening, the top surface of this upper portion being substantially in the plane of the opening, and meeting the outer surface of the handgrip portion at a substantial angle, and a handle of heat insulating material secured to the cover and projecting transversely outwardly therefrom substantially parallel to the upper transverse pouring handle portion and with its lower surface in the plane of the opening and adapted to engage the top surface of the upper pouring handle portion when the cover is closed, the cover handle having a downwardly and outwardly tapering upper surface intersecting the lower surface at the point where the top surface of the upper pouring handle portion meets the outer surface of the main handgrip portion thereby providing a smoothly merging surface where the cover and pouring handles meet.

JOHN N. POLIVKA.

REFERENCES CITED

The following references are of record in the file of this patent:

UNITED STATES PATENTS

| Number | Name | Date |
|---|---|---|
| 1,226,524 | Jeffries | May 15, 1917 |